July 9, 1968  S. M. BRASSINGTON  3,391,624
CAMERA AND CAMERA MECHANISM
Filed Dec. 2, 1965  2 Sheets-Sheet 1
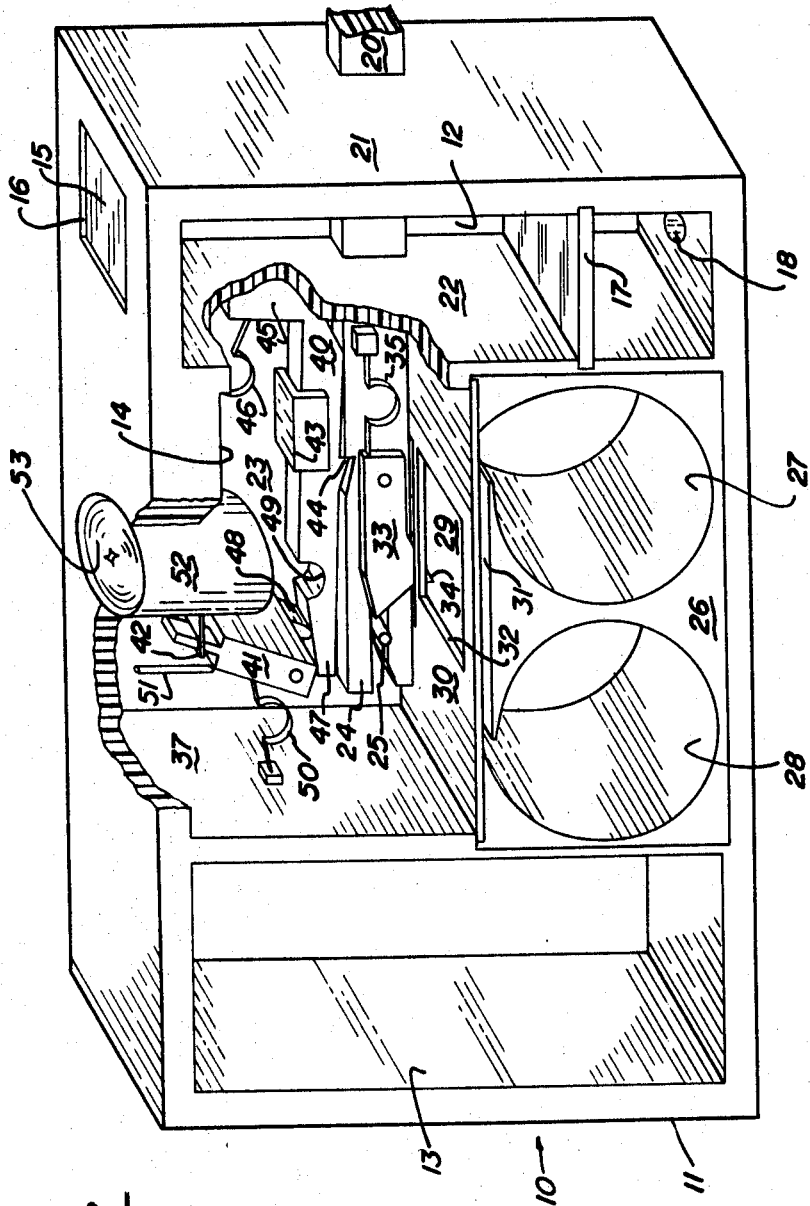
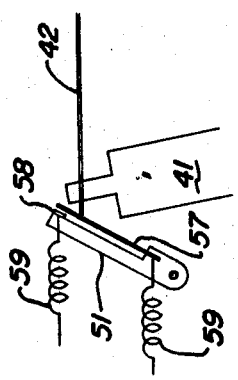
INVENTOR
SAMUEL M. BRASSINGTON
BY *Joseph L. Strabala*
HIS ATTORNEY July 9, 1968  S. M. BRASSINGTON  3,391,624
CAMERA AND CAMERA MECHANISM
Filed Dec. 2, 1965  2 Sheets-Sheet 2

INVENTOR
SAMUEL M. BRASSINGTON
BY Joseph L. Strabala
HIS ATTORNEY

# United States Patent Office 3,391,624
Patented July 9, 1968

3,391,624
CAMERA AND CAMERA MECHANISM
Samuel Milton Brassington, 1101 Kenwal Road,
Concord, Calif. 94521
Filed Dec. 2, 1965, Ser. No. 511,189
11 Claims. (Cl. 95—11)

The present invention relates to a camera and camera mechanism for photographic cameras, and more particularly, a camera and camera operating system which includes a shutter, a film transport device and, if desired, a film counter unit which are all operated through a single actuator or station.

For the convenience of the photographer, amateur and professional alike, it has become conventional on the more expensive cameras, to combine the operations of several functional parts of the camera on a single actuator or station. For example, it is often conventional to couple the operations of the shutter cocking mechanism, the film transport device and the film counting unit on a single actuator or lever so that its movement will cause all three of these functions to occur simultaneously when it is operated. However, while such conveniences are commonplace on the more expensive cameras, they are seldom incorporated in the cheaper cameras since they are relatively expensive, somewhat complex and usually quite bulky.

Besides the above convenience of a single actuator for several functions, the cameras of moderate costs, as well as the more expensive, usually have very complex shutters to control the exposure time. Between-the-lens shutters are probably the most common in these more expensive cameras and are usually composed of a plurality of blades which overlap one another to prevent light from passing through the lens. The blades are pivoted about the aperture and by means of springs, cams and a chain of gears they are caused to swing about their pivot to open and let light through the lens for the desired interval and then return to their overlapped position. The well known "Compur" shutter is of this type. In these multi-speed shutters having the blades pivoted around the aperture are complicated and the slower shutter speeds are worked with a set of gears and the faster speeds by a powerful spring. Through this arrangement it is possible to achieve times from several seconds to 1/1000 of a second.

From the foregoing discussion it can be appreciated that the "Compur" shutter or others of a similar character are precision devices and would be too expensive to use in the cheap and inexpensive cameras. Thus, for the most part, the cheaper cameras have what is known as the simple rotary shutter. This latter shutter is of the simplest type and commonly is incorporated in box cameras. It consists of a metal disk having a small hole placed in front of the lens. When the camera is tripped the disk is rotated about by a pivot adjacent to the lens by a spring and the hole passes across the front of the lens admitting light through the lens as the hole moves across the lens. The exposure time is usually around 1/25 of a second in simple rotary shutters and is the only one available with the exception of the "bulb" position in which the trip will hold the hole in front of the lens as long as the trip is held. Because of the simplicity of the rotary shutter, it is considerably less expensive than such shutters as the single-leaf shutter and the everset shutter, both of which are more flexible as to exposure speed but not equivalent to the "Compur" shutter.

Largely because of the above factors the cheap or inexpensive camera is devoid of such features as shutter speed control and single actuator control of multiple functions such as the operation of the shutter, film transport device and film counter unit. Accordingly, it is an object of this invention to provide a camera and camera operating system which are both cheap and reliable and yet provides shutter speed control and single actuator control of the shutter and film transport device.

Another object is the provision of a novel shutter mechanism for photographic cameras which is especially adaptable to miniature cameras.

Also, it is an object of this invention to provide a simple, economical operating mechanism for cameras which gives a camera in which it is incorporated a great increase in flexibility with little or no increase in cost.

Another object of this invention is the provision of a shutter system for photographic cameras which will be so simple and economical that it can be incorporated in cheap, inexpensive cameras and improve their flexibility without an increase in cost.

A further object of the present invention is the provision of a single actuator or lever so incorporated with the operating mechanism that double exposures are impossible.

An important object of the present invention is the provision of a cheap miniature camera which is so inexpensive it can be used also as a mailable container for sending the exposed film therein to the film processor.

One other object is the provision of high quality miniature cameras which are so cheap that it is suitable as gift bonuses for the promotion of commercial products or enterprises.

Many other objects of this novel camera mechanism will be apparent from the description of the drawings which follows and the invention is not to be considered limited by the few objects set forth above, since there are many other objects, such as the provision of a novel, cheap between-the-lens shutter system, which will be apparent to those skilled in the art from this disclosure.

Basically, the above objects and others apparent in this disclosure are accomplished in a camera having a camera body and a lens system by incorporating a camera mechanism comprising, (1) an operating plunger reciprocally mounted in the camera body, (2) a rocking member faced against the plunger and having a tooth engaging the plunger so the rocking member will be carried with the plunger, (3) biasing means engaging the rocking member and opposing its movement with the plunger and also urging the rocking member to tilt to free the tooth from the plunger, (4) biased toggle means pivoted on the camera body and having one end thereof bearing on the rocking means to prevent it from tilting until a notch in the rocking means moves under the end of the end of the toggle means, and (5) shutter means linked to the toggle means and operable to admit or restrict light passage through the lens system depending on the position of the toggle means when the latter is rotated about its pivot by the movement of the rocking member.

The above brief description of the novel camera and camera mechanism of this invention will be better understood by reference to the drawings accompanying this application wherein:

FIGURE 1 is a perspective of a miniature camera having this novel mechanism incorporated therein with one of the camera's sides removed and parts broken away to show the internal details;

FIGURE 5 is schematic of the exposure time set stop incorporating an electrical contact system for operation of a flash with the novel camera and camera mechanism.

Figure 2:
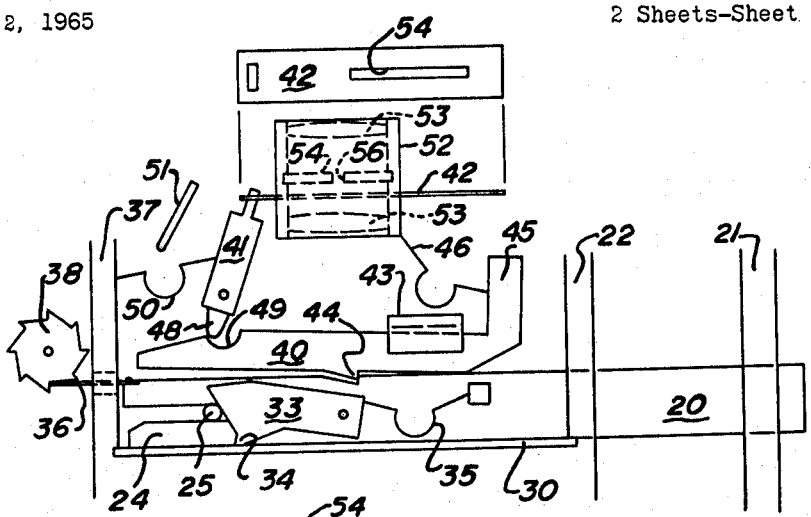
FIGURES 2, 3 and 4 are a stop-action sequence of the mechanism in schematic showing the shutter operation of this novel camera mechanism as it trips.

Referring to FIGURE 1, showing a perspective, the miniature camera 10 has one side or cover (not shown) removed and parts broken away so that the construction of the camera mechanism incorporated therein can be seen. Basically, the camera shown in FIGURE 1 is about the same size of a package of cigarettes and has a generally similar rectangular shape. The camera body 11 is divided into three main compartments, having a viewfinder compartment 12 at one end and a storage compartment 13 at the other. The central compartment 14, a light tight box when the side or cover is on, contains the lens system, the camera's primary operating mechanisms and the film storage magazine.

The viewfinder shown in FIGURE 1 is of a standard type having an objective lens 15 mounted in a lens aperture 16 in one end of the viewfinder compartment 12 and a secondary lens 17 centrally located within the compartment so that the image in front of the camera's lens system can be seen through the viewfinder peep hole 18 located at the opposite end of the compartment from aperture 16. In most inexpensive cameras the lenses 15 and 17 of the viewfinder can be plastic lenses and the objective lens 15 should be recessed into the camera body 11 to prevent scratch-damage to its exposed outer surface.

Storage compartment 13 at the opposite end from the viewfinder has several alternative functions, one of which is the storage of additional film and/or film magazines if the camera is designed for replaceable magazines as described later. An alternative and novel use of this storage compartment is for the insertion of and storage of money during the mailing of the camera for processing the film when the camera itself is used as a mailing container for the exposed film. A cheap embodiment of this miniature camera is designed to be dispensed in vending machines at a very nominal cost, preloaded with film and ready to operate. In this embodiment, the purchaser, after he has taken a number of photographs can insert money in the storage compartment, glue a return address label on the camera, apply postage and mail it to a film processor. The processor will develop the film and send the prints to the purchaser via return mail. Since, in this embodiment, the cost of the camera is nominal, the camera would probably be discarded since the cost of reloading the camera and returning it with the prints would exceed the initial price of the camera. Further, the camera mechanism and lenses may be damaged in the mails.

Features in the camera described above will add new dimensions for one who is without a camera and yet wishes to photograph something which he is currently experiencing, since all he has to do is approach a nearby vending machine to obtain such a camera completely ready to operate. Further, since the novel operating mechanism in this miniature camera gives it a variable shutter speed coupled with the inherent optical advantage of miniature cameras (the same or greater depth of field as larger cameras), the quality of the photographs taken with this miniature camera will probably often approach those made with more expensive equipment. In fact, considering in addition, the easy portability of a miniature camera about the size of a package of cigarettes, its low cost and its outstanding performance, cameras made according to this invention might well become a permanent part of the apparel of the avid shutter-bug.

While the novel camera mechanism of this invention need not be incorporated in miniature cameras, and will work in larger cameras or even in movie cameras, it probably represents a major break through in cheap, miniature cameras, since this camera mechanism is acturally very simple and inexpensive to produce. In the embodiment shown in FIGURE 1, the operating mechanism has a plunger 20 which is reciprocally mounted in the camera body 11 in two apertures in the walls 21 and 22 of the viewfinder compartment 13. Generally, the longitudinal axis of the plunger 20 will be parallel with the longitudinal axis of the camera and the plunger will be located adjacent to the nonremoval side 23 of the camera body 11 so as not to obstruct the path of the light passing through the lens system of the camera 10 when the shutter is opened. The inboard end 24 of the plunger is bifurcated and an aligning pin 25 is affixed normal to side 23 so that it will be received in the bifurcated end of the plunger to act as a guide for the end of the plunger extending into the central compartment 14 of the camera.

The aligning pin 25 also has another function in the embodiment shown in FIGURE 1 which is to cause the film transport mechanism to release the film strip (not shown) after the film has been advanced the proper distance for the next picture. Basically, this function can be better understood by first describing the film magazine 26 of the camera 10. In the embodiment shown in FIGURE 1, the film magazine 26 is shown as a removable unit having two cylindrical film storage recesses 27 and 28 located side by side for holding rolls of film.

Both of the film storage recesses 27 and 28 of magazine 26 have an aperture extending from the recess to an outside surface of the magazine. A portion of the magazine between these apertures forms a film support table 29 across which the film stored in one of the recesses can travel to the adjacent film storage recess. A film retaining plate 30 is mounted in the magazine so that it leaves a slight film slot 31 between the support table 29 and the plate so that the film will be sandwiched between the plate and the table, holding the film flat on the table as it moves from one storage recess to the other as frames are being exposed.

The film retaining plate 30 has an exposure window 32 (an aperture) centrally located above the film support table 29. This window frames a portion of the film which will be exposed by the light passing through the lens system when the shutter is opened for each picture (as can be seen in FIGURE 1). The film is advanced across the table for each subsequent frame or picture.

In order to advance the film for each subsequent frame the operating mechanism uses a simple pawl arrangement which is capable of ratcheting the film across the surface of the film support table 29 by engaging the sprocket holes along the edge of the film. The film retaining plate 30, on the edge adjacent to plunger 20 when the film magazine 26 is installed in the camera, is relieved or notched so that the sprocket holes along the edge of the film are exposed to the pawl assembly. A film advance pawl 33 is pivoted centrally on the inboard end 24 of the plunger 20 so that its tooth 34 can extend through relieved portion of the retaining plate and engage the sprocket holes of the film on support table 29 as can be seen in FIGURE 1. The tooth 34 is relieved on one side so that it will slip out of the sprocket holes of the film when the plunger 20 is pulled out of the camera and a spring 35 mounted between the plunger and the pawl provides a positive pressure through the tooth on the film support table so that the tooth engaging the sprocket holes will catch and move the film across the support table when the plunger is pushed into the camera. The free end of the film advance pawl 33 is tapered so that it will ride up on pin 25 lifting the tooth out of the film's sprocket holes prior to the shutter actuation since the film must be stationary when the shutter opens. This simple pawl assembly carries the plunger 20 and advances the film one frame everytime the plunger is depressed.

The film magazine 26 is shown in FIGURE 1 as a removable unit but it alternatively can be an integral part of the camera 10 and molded with the body with the film retaining plate 30 inserted in slots provided for it. When the camera is designed for the replaceable magazine unit, the film storage recesses 27 and 28 will have light tight covers (not shown) over recesses 27 and 28 to protect the film and an extra magazine can be carried in the storage compartment 13.

Figure 3:
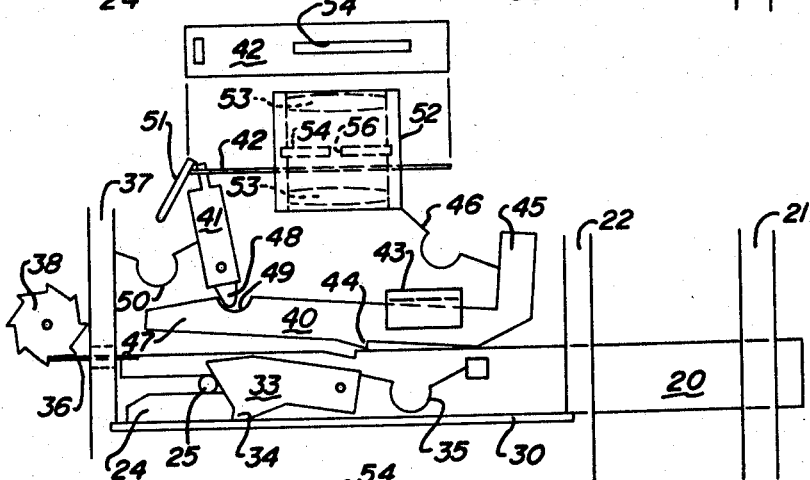
Figure 4:
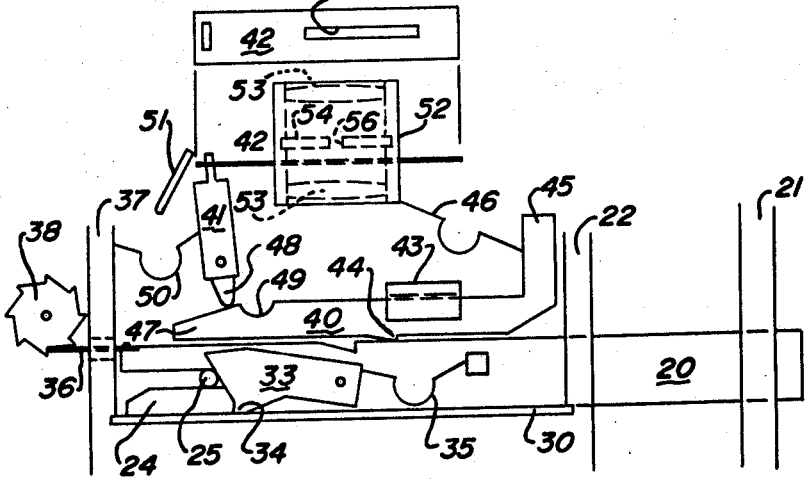

Referring to FIGURES 2, 3 and 4, it can be seen that the inboard end 24 of plunger 20 has a stiff flexible finger 36 which forms an extension of this end of the plunger. This finger extends through an aperture in the wall 37 of central compartment 14 and when the plunger is depressed the finger engages a toothed or notched wheel 38 causing it to rotate one unit. This toothed wheel is connected through a shaft to a dial indicator (not shown) on the outside of the camera which shows the camera operator the number of exposures which have been made. This provides a simple film counter for the miniature camera 10.

One of the more novel features of this unique camera is the shutter mechanism associated with plunger 20. Referring to FIGURE 1, it can be seen that three other assemblies are associated with the plunger to form the shutter mechanism. These assemblies are the rocking member 40, the toggle unit 41, and shutter 42.

The rocking member 40 resting on plunger 20 is shown as a beam type structure in the drawings, though it could have a variety of shapes. Basically, the rocking member is a free floating member being retained in position by a loose fitting guide 43. The rocking member has a lug 44 on the edge resting on plunger 20 and the plunger has a notch into which the lug can fit into when the plunger is in the extended position (as shown in FIGURE 1). The rocking member also has a heel 45 which is pushed into wall 22 by a leaf spring 46 and because the heel has a surface which is at a right angle to the rocking member pushed against the wall it tends to rock the member so that the lug drops into the notch in the plunger when the latter is pulled out of the camera body 11 sufficiently to cause the notch to move under the lug.

With the plunger 20 in the extended position (pulled out of the camera body) and lug 44 slips into the notch in the plunger, the rocking member 40 is carried with the plunger when it is pushed into the camera to trip the shutter, the lug forming an interlock between the plunger and the rocking member. The heel 45 is relieved or cut away at its base adjacent to plunger and the spring 46 being located high on the heel and urging it down as well as back against the wall tends to rock the member in a direction so as to free the lug from the notch in the plunger as the heel moves off the wall 37 allowing the spring 46 to exert a tilting force on the rocking member 40.

While the spring 46 is urging the heel 45 of the rocking member 40 downwardly toward the plunger 20 the upper side of the toe 47 of the rocking member is abutted against an ear 48 of the toggle 41 preventing the member from rocking sufficiently to free the lug 44 from the notch. Thus, the rocking member will be carried with the plunger until the notch 49 moves under the ear which allows the member to rock sufficiently to free the lug from the notch or recess in the plunger.

At this point the film advance pawl 33 having riden up on pin 25 has previously released the film and the film will be stationary ready for exposure and the tilting of rocking member 40 will free the lug 44 from the notch in the plunger 20 when the ear 48 moves into notch 49. Since the toggle unit will be rotated about its pivot as spring 46 pushes the rocking member back toward its initial position after the lug has been released from the plunger since the ear 48 of the toggle is in notch 49 in the rocking member at this time. The toggle has a light toggle return spring 50 which opposes the rotational movement of the toggle by the rocking member about its pivot which is overpowered by spring 46 since it is considerably weaker than spring 46 returning the rocking member to its initial position. Usually spring 46 exerts about twice the force on the mechanism than does the toggle return spring 50 and is able to overpower the latter as well as any frictional forces in the mechanism.

The action of the rocking member 40 and the toggle 41 after lug 44 is released from the plunger 20 as the plunger is depressed, can be best seen in FIGURES 2, 3 and 4 of the drawings. FIGURE 2 shows the rocking member beginning to tilt to free the lug from the plunger as the ear 48 of the toggle slides into notch 49. In FIGURE 3, spring 46 has moved the rocking member back toward its initial position (shown in FIGURE 1) carrying the ear of the toggle with it and causing toggle 41 to rotate about its pivot. Also, the toggle 41 is shown hitting the exposure stop set lever 51 in FIGURE 3 which limits the rotation of the toggle being effected by the movement of the rocking member. At such time the toggle hits the stop set lever, the rocking member will tilt back and forth on lug 44 releasing the toggle because of the rounded character of notch 49 and ear 48. Then the toggle return spring 50 will counter rotate the toggle about its pivot back to its initial position and the rocking member will continue to move back to its initial position under the influence of spring 46. The toe 47 of the rocking member has its upper surface relieved slightly to prevent any jambing of the mechanism. The stop lever can be positioned from outside the camera to change the degree of rotation of the toggle about its pivot and this will change the exposure interval of the shutter 42 which will be now more fully described.

Best seen in FIGURES 2 and 3 and 4, the shutter 42 consists of flat spade or leaf which moves reciprocally in the lens barrel 52 of the camera between the spaced lenses 53 perpendicular to the lens system's optical axis. The shutter spade cooperates with the diaphragm 54 between the lenses 53 and the shutter spade has a slot opening 55 in its central portion which moves into registry with the hole 56 in the diaphragm when the spade is reciprocated in the lens barrel. As can be seen in FIGURES 2, 3 and 4, the shutter spade has one end connected to the end of the toggle 41 on the opposite side of the pivot from ear 48 and as the toggle is rotated and counter-rotated the shutter spade is reciprocated within the lens barrel allowing the slot in the spade to move under the hole (in registry) in the diaphragm to open the lens system for the passage of light therethrough, which can be better understood by referring to the extra shutter spade 42 shown above the mechanism of FIGURES 2, 3 and 4, so that the relationship of the hole and slot can easily be seen. Of course, the degree of rotation of the toggle will determine the time the slot in the registry with the hole in the diaphragm and consequently determine the exposure time. As mentioned before the stop set lever 51 controls the degree of rotation of the toggle and therefore, it controls the exposure time of the shutter. It should be appreciated that a lens barrel as such need not be used and is merely illustrative.

Another feature of this novel camera mechanism is the provision of a photoflash system which is shown in FIGURE 5. In the embodiment shown the stop set lever 51 has a flexible leaf 57 and a contact 58 which are slightly separated from one another and are connected in the photoflash circuit 59 as a switch. As the toggle 41 is rotated through the action of the rocking member 40 under the influence of spring 46 the toggle or shutter 42 contacts the flexible leaf pushing it against the contact and completing the flash circuit. Since at the time the toggle or shutter contacts the leaf the shutter is open the system is synchronized. In the arrangement shown in the drawings an over-travel system is used. The leaf is too flexible to cause the ear 48 to disengage from the rocking member 40 and the toggle 41 continues to rotate until it hits the solid portion of the stop set lever 51 beneath the leaf which is subsequent to the time the flash circuit is completed.

Viewing the drawings, it can be appreciated that the camera and mechanism has a single operator or actuator plunger 20. To operate the camera plunger 20 is merely pulled out of the camera body a short distance, at which time lug 44 will drop into the notch in the the plunger. When the plunger is depressed the film advance pawl 33 mounted thereon, will advance the film by engaging the sprocket holes in the film's edge until it is lifted free of the sprocket hole by riding up on pin 25. As the plunger is depressed still further the rocking member 40 which is being carried with it because of the engagement of lug 44 tilts when ear 48 of the toggle 41 slips into the notch 49, freeing lug 44 from the plunger. Spring 46 then drives the rocking member back toward its initial position and the toggle 41 is rotated about its pivot since its ear is retained in the notch on the sliding rocking member until the toggle hits the stop set lever 51 at which time the rocking member rocks back and forth using the lug 44 sliding on the plunger as a fulcrum releasing the toggle. The toggle return spring 50 then counter rotates the toggle back to its initial position. The rotational and counter-rotational movement of the toggle about its pivot moves the shutter spade 42 connected thereto, reciprocally back and forth in the lens barrel 52 opening and closing the lens system to light. The plunger is merely pulled out and depressed again for the next photograph with all functions within the camera being effected through the plunger 20.

The bias of the springs, location of the lug on the rocking member and other features of the mechanism are important in the design of cameras but these are shown in the drawings and their exact detail can be worked out by persons skilled in the art.

In the cheapest model of the camera, many of the parts can be fabricated from plastics or stamped out of metal since the simple toggle operation is reliable even if not precision made. Of course, the camera body will usually be plastic, and plastic lenses for the lens system will also be satisfactory.

Considering the simplicity of this camera and its mechanism coupled with the ease of plastic fabrication, it is anticipated that it could be sold for well under one dollar complete with film and ready to operate.

Having described my invention, I claim:

1. A camera mechanism for incorporation into a camera having a camera body and a lens system comprising:
    (a) plunger means reciprocally mounted in said camera body to move in and out of said body;
    (b) rocking means faced against said plunger means and having a lug engaging said plunger means so that said rocking means is carried with said plunger means when the latter is pushed into said camera body;
    (c) spring means engaging said rocking means and opposing its movement with said plunger and also urging said rocking means to tilt in a direction which will free said lug from said plunger means;
    (d) toggle means pivoted on said camera body and having an end bearing on said rocking means which prevents said rocking means from tilting because of the urging of said spring means until a notch in said rocking means moves under said end of said toggle means at which said rocking means will tilt sufficiently to free said lug from said plunger and allow said spring means to return said rocking means to its initial position, said end of said toggle means received in said notch of said rocking means being carried with said rocking means until said end is freed from said notch causing said toggle means to be rotated about its pivot;
    (e) biasing means opposing the rotational movement of said toggle means and operable to counter-rotate said toggle means back to its initial position when said end is freed from said notch; and
    (f) shutter means connected to said toggle means and operable to admit and restrict light through said lens system relative to the position to said toggle means.

2. The camera mechanism as defined in claim 1 wherein the plunger means includes a finger means and the camera body includes a rotatable tooth wheel means which coact when said plunger is depressed into said camera body to advance a film counter associated with said wheel means one unit each time said plunger means is pushed into said camera.

3. The camera mechanism as defined in claim 1 wherein the shutter means includes a diaphragm having a central opening in the optical axis of the lens system and a reciprocating spade means positioned adjacent to said diaphram which is connected to the toggle means and which is reciprocated thereby to open and close said central opening by the movement of said toggle means.

4. The camera mechanism as defined in claim 1 wherein the plunger means includes a film advance pawl means which will engage the sprocket holes in film loaded in said camera and advance it one frame prior to the release of the rocking means from said plunger each time said plunger means is pushed into said camera.

5. The camera mechanism as defined in claim 4 wherein the film advance pawl means is a spring biased arm having a tooth, said arm pivoted on the plunger means.

6. The camera mechanism as defined in claim 1 wherein an adjustable stop means limits the travel of the toggle means with the rocking means after the end of said toggle means has been received in a notch in said rocking means thereby causing said end of said toggle means to release from said notch of said rocking means as it returns to its initial position under the influence of the spring means and allow the biasing means on said toggle means to return it to its initial position whereby the exposure time of the camera mechanism is controlled.

7. The camera mechanism as defined in claim 6 wherein the stop means includes a circuit switch means for operating a flash unit with the camera mechanism.

8. An inexpensive minute camera designed to function as its own mailing container for exposed film comprising:
    (a) camera body having a light tight compartment and a lens system;
    (b) plunger means reciprocally mounted in said camera body;
    (c) floating rocking means faced against said plunger means within said light tight compartment and having a lug engaging said plunger means so that said rocking means will be carried with said plunger means when the latter is pushed into said camera body;
    (d) spring means engaging said rocking means and opposing its movement with said plunger means and also urging said rocking means to tilt in a direction which will free said lug from said plunger;
    (e) toggle means pivoted on said camera body within said compartment and having an end portion faced on said rocking means preventing said rocking means from tilting under the influence of said spring means until a recess in said rocking means moves under said end at which time said rocking means will tilt sufficiently to free said lug from said plunger and said spring means will drive said rocking means back to its initial position whereby said toggle means is rotated about its pivot;
    (f) biasing means engaging said toggle means and opposing its rotation by said rocking means;
    (g) spade means connected to said toggle means and reciprocated by the movement of said toggle means; and,
    (h) a diaphram having a central opening in the optical axis of said lens system and having its central opening opened and closed by the reciprocation of said spade means thereby forming a shutter.

9. The camera defined in claim 8 wherein the lens system is at least a doublet and the spade means and the diaphram are between the lenses.

10. The camera as defined in claim 8 wherein an adjustable stop means is included to stop the rotational movement of the toggle means effected by the rocking member when the latter is returned to its initial position by the influence of the spring means engaging it thereby controlling the time that light can pass through the central opening in the diaphragm.

11. The camera as defined in claim 8 wherein the body of the camera includes another compartment for inserting money for developing film when the camera is used as a mailing container.

References Cited

UNITED STATES PATENTS

| | | | |
|---|---|---|---|
| 1,366,158 | 1/1921 | Brown | 95—11 |
| 1,563,463 | 12/1925 | Belugou | 95—11 XR |
| 2,620,712 | 12/1952 | Clifford | 95—11 |
| 2,838,983 | 6/1958 | Burger | 95—11.5 |

JOHN M. HORAN, *Primary Examiner.*

NORTON ANSHER, *Examiner.*

FRED L. BRAUN, *Assistant Examiner.*